June 16, 1936.  R. K. LEE  2,044,581
INTERNAL COMBUSTION ENGINE
Original Filed Feb. 16, 1933   2 Sheets-Sheet 1

INVENTOR.
Roger K. Lee.
BY
ATTORNEYS.

June 16, 1936.  R. K. LEE  2,044,581
INTERNAL COMBUSTION ENGINE
Original Filed Feb. 16, 1933  2 Sheets—Sheet 2
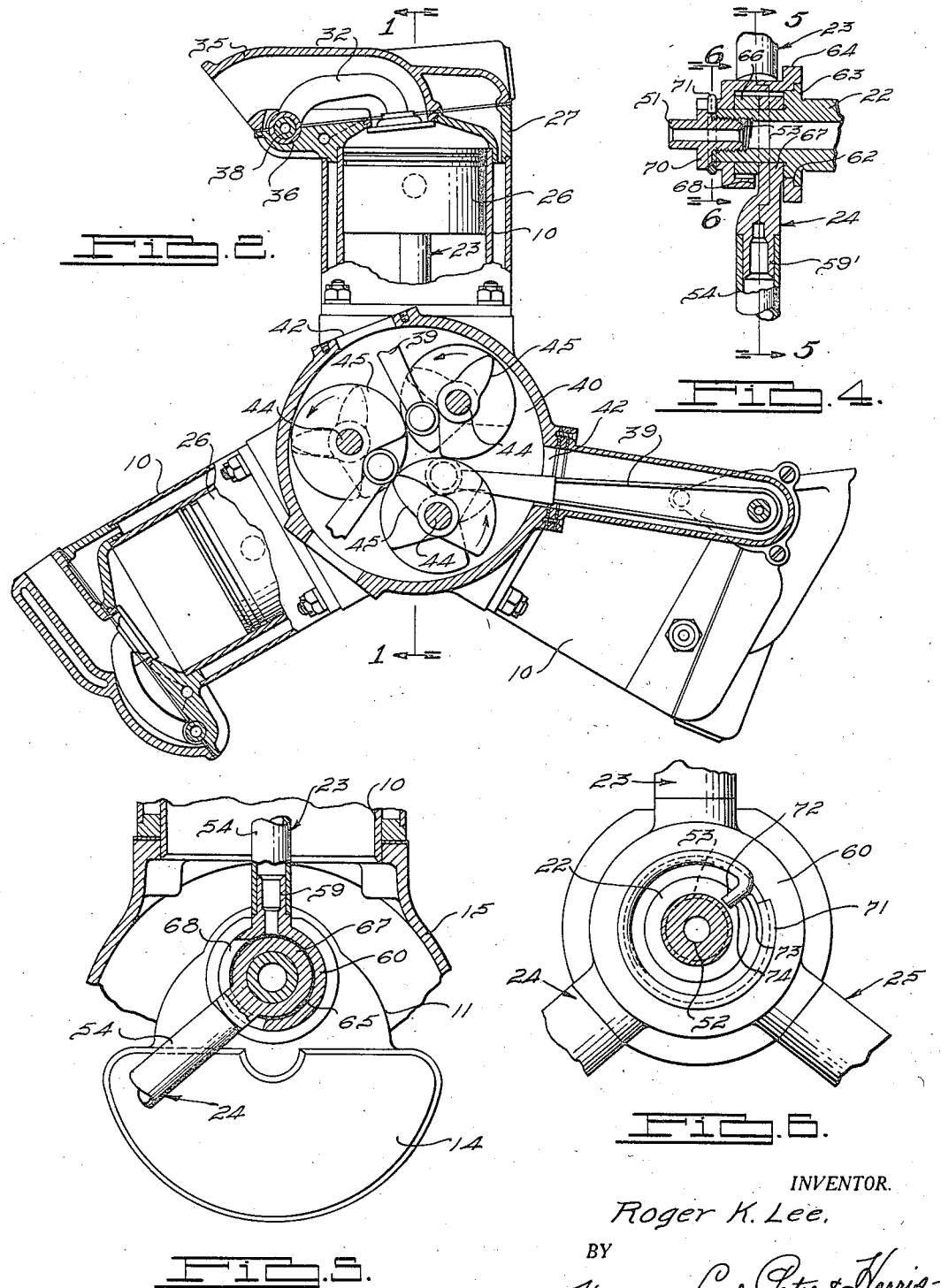
INVENTOR.
Roger K. Lee.
BY
Harness, Lind, Patee & Harris
ATTORNEYS.

Patented June 16, 1936

2,044,581

UNITED STATES PATENT OFFICE 2,044,581

INTERNAL COMBUSTION ENGINE

Roger K. Lee, Highland Park, Mich., assignor to Chrysler Corporation, Detroit, Mich., a corporation of Delaware Original application February 16, 1933, Serial No. 657,146. Divided and this application June 13, 1934, Serial No. 730,433

20 Claims. (Cl. 74—580)

This invention relates to internal combustion engines and refers more particularly to improvements in means for transmitting power from the engine piston or pistons to the crankshaft, and to improved mechanisms associated therewith.

This application is a division of my co-pending application, Serial No. 657,146, filed February 16, 1933.

It is an object of my invention to provide an improved connecting rod structure and an improved assembly of connecting rods and crank pin or other operated device whereby the engine may be successfully operated at speeds materially higher than the usual speeds of conventional engines used for driving motor vehicles, for example. While my improvements are not necessarily limited in their application to such high speed engines or to engines for driving motor vehicles, they are particularly adapted to such applications.

A further object of my invention is to provide an improved connecting rod of unusually light weight, at the same time affording the strength requisite for engine operation especially at relatively high speeds.

Another object of my invention is to provide an improved connecting rod assembly particularly adapted to engines having radially arranged cylinders wherein the connecting rod bearings may be relatively small and compactly arranged in association with each other and with the crank pin operated thereby.

The desired increase in engine speeds over conventional practice is, among other things, limited by the loads produced by the weight of the reciprocating parts experienced at the connecting rod bearings, such loads greatly increasing in magnitude as the piston speed increases and a further object of my invention is to overcome the aforesaid difficulties limiting engine operation at relatively high speeds.

Another object of my invention, in its somewhat more limited aspects, is to provide an improved connecting rod or rod assembly acting on a cantilever crank or crank pin, the crank pin preferably being mounted for rotation on its axis relative to the crankshaft rotation as the crank pin is rotatably displaced by the connecting rods to rotate the crankshaft. Such arrangement permits the connecting rods to be made of unusually light weight and to thereby minimize the forces produced by the reciprocation of the connecting rods.

Still further objects of my invention are to provide an improved connecting rod structure wherein the rod is formed with a solid or unitary bearing; to provide an improved rod having a piston pin carried as a unitary structural part of the main rod portion; and to provide a two-piece connecting rod having component parts thereof securely connected to form a unitary structure comprising a bearing portion and a main rod portion.

Another object of my invention is to provide a unitary piston pin and connecting rod structure and to provide a circular unitary connecting rod bearing portion free from customary caps and cap-securing bolts, the bearing portion being preferably attached by welding for added lightness of weight to the main rod portion of the connecting rod structure.

An additional object of my invention is to provide an improved connecting rod assembly including a driving pin or equivalent element for actuating a mechanism associated with the engine such as the valve mechanism by way of example.

Further objects and advantages of my invention will be more apparent from the following detailed description of one illustrative embodiment thereof, reference being had to the accompanying drawings in which:

Fig. 1 is a sectional elevational view longitudinally through my engine, the section being taken along the line 1—1 of Fig. 2.

Fig. 2 is a transverse sectional elevational view through the valve operating chamber of the engine shown in Fig. 1, parts of several of the engine cylinders being broken away.

Fig. 3 is a detail sectional view illustrating my connecting rod and crank pin assembly, the section being taken along the line 3—3 of Fig. 1.

Fig. 4 is a further detail sectional view of the assembly shown in Fig. 3, the section being taken along the line 4—4 of Fig. 3.

Figs. 5 and 6 are further detail sectional views of the assembly shown in Figs. 3 and 4, these views being respectively taken along the lines 5—5 and 6—6 of Fig. 4.

Referring to the drawings, I have illustrated my improvements in an internal combustion engine of the type having a plurality of cylinders 10 radially arranged with respect to the engine crankshaft 11 which is rotatably journaled by longitudinally spaced front and rear bearings 12 and 13 respectively. The crankshaft 11 may be appropriately counterweighted, one counterweight thereof being illustrated at 14 at the forward portion of the crankshaft which projects beyond bearing 12 and into the substantially cylindrical crankcase structure 15, the latter being provided with circumferentially spaced openings 16 concentric with and adapted to receive the respective cylinders 10. The rear portion of the crankshaft 11 projects through the crankcase extension cover 17 which supports the aforesaid rear bearing 13 to provide a power take-off 18 for driving the motor vehicle or for operating such other machine or device as may be desired.

The crankshaft 11 is provided with a crank or crank pin 19 which, according to the present illustrated embodiment of my invention, is journaled for rotation about its axis relative to the crankshaft during rotary displacement of the crank pin by reason of the forward and rear anti-friction type bearings 20 and 21 respectively. The crank pin 19 is preferably of the cantilever type having a cantilever portion thereof 22 which projects forwardly of the crankshaft 11 and into the crankcase 15 for operation by the connecting rods 23, 24, and 25, these rods extending radially outwardly from the crank pin for connection to the respective pistons 26 operating in the aforesaid cylinders 10.

Each cylinder 10 is provided with a suitable cylinder head 27 forming a combustion chamber 28, Fig. 1 illustrating a typical arrangement of a cylinder and associated parts wherein the cylinder head 27 is ported for passage of intake and exhaust gases under control of the intake and exhaust valves 29 and 30 respectively.

I have illustrated these valves as having a positive operation during the opening and closing movements thereof, the valve 30 being operated by a lever arm 31 and the valve 29 being operated by a generally similar lever arm 32, these lever arms operating in the respective exhaust and intake gas passages 33 and 34 provided by the cylinder head cover member 35. As illustrated in Fig. 2 the lever arm 32 is actuated by connection with a tubular rock shaft 36 journaled between the cover 35 and the cylinder head 27, the rock shaft 36 extending forwardly beyond the cylinder head 27 as shown in Fig. 1 for connection with the inwardly extending lever arm 37. Likewise the lever arm 31 of the exhaust valve 30 is connected with a rock shaft 38 telescoped within the rock shaft 36 and extending forwardly therebeyond as illustrated in Fig. 1 for connection with a similar operating lever 39. The operating lever arms 37 and 39 extend inwardly into a valve operating chamber 40 which forms a forward extension of the crankcase 15 and is preferably substantially separated therefrom by a transverse web or wall 41. The circumferential bounding wall of the chamber 40 is provided with circumferentially spaced openings 42 through which the respective pairs of lever arms 37 and 39 extend for operating the respective valves 29 and 30 for each cylinder. Journalled between the transverse wall 41 and a front cover plate 43 for the chamber 40 are a plurality of valve shafts 44 preferably the same in number as the number of engine cylinders, each valve shaft having fixed thereto two pairs of cams 45. The arrangement is such that a pair of cams 45 on each valve shaft 44 cooperates with a corresponding pair of cams on the next adjacent valve shaft for receiving therebetween the inner end of a pair of the lever arms 37 and 39 for positively reciprocating the intake and exhaust valves 29 and 30 associated with each of the cylinders 10.

Each valve shaft 44 has a gear 46 located in the crankcase 15 for driving the valve shaft associated therewith, the gears 46 meshing with a common driving pinion 47, the gears being so proportioned that for a four-stroke cycle engine the valve shafts 44 will be simultaneously driven in the same direction at half the crankshaft speed as will presently be more apparent. In order to accommodate the various pairs of lever arms 37 and 39 in association with the operating cams 45, the pairs of cams on the respective valve shafts 44 or on certain of these valve shafts may be sufficiently spaced to prevent any interference at the inner ends of the lever arms 37 and 39, it being understood that certain of the telescoping rock shafts 36 and 38 may project forwardly sufficiently to register the cam-operated lever arms associated therewth with the forwardly spaced pair of cams 45 shown in Fig. 1.

The aforesaid driving pinion 47 has a driving disc 48, the pinion and disc being journaled on a shaft 49 supported by the partition wall 41 and projecting rearwardly therefrom into the crankcase 15 adjacent the forwardly extending cantilever portion 22 of the crank-pin 19.

The valve gear driving disc 48 is provided with a circumferential series of openings 50 adapted to selectively receive the forwardly projecting end 51 of a driving pin 52 threaded at 53 into the forward end of the crank pin 19.

The driving pin 52 is locked in place with the crank pin 19 as will be presently more apparent, the end 51 being selectively engageable with the openings 50 of disc 48 in order to vary the timing of the valve driving mechanism with respect to the crankshaft 11. The openings 50 are preferably radially enlarged as shown in Fig. 1 so that the disc 48 will not take any of the load of the crank pin 19, the disc 48 having only rotation with the crankshaft 11 by reason of the projecting driving portion 51 of the pin 52. Thus, the shaft 49 has its axis coinciding with the axis of the crankshaft.

The pistons 26, cylinders 10, cylinder heads, valves, and valve operating mechanism do not in themselves constitute a part of my invention as claimed in this application, such parts being described and claimed in my aforesaid co-pending application and other divisions thereof and I desire to point out that such parts may be of any desired construction and arrangement within keeping of the general objects and spirit of my invention.

Each of the aforesaid connecting rods such as the connecting rod 23 illustrated in Fig. 1 is formed of a main rod or column portion 54 preferably in the form of a hollow cylindrical tube for lightness of weight and maximum strength. The outer end of each main rod portion 54 receives the hollow stem 55 of a hollow piston pin 56, the stem 55 being preferably welded in place to the main rod portion 54 to provide substantially a unitary T-shaped outer end for each of the connecting rods.

Each piston pin 56 may be suitably connected with an associated piston 26, the construction illustrated including a pair of piston pin bosses 57 adapted for assembly on the piston pin and then inserted into suitable openings in the head of the piston and secured thereto in an appropriate manner which may include welding as indicated at 58.

The inner end of the main rod portion 54 of the connecting rod 23 receives the outwardly extending stem or projection 59 which is preferably hollow to further lighten the weight of the connecting rod, the stem being secured in place preferably by welding.

The stem 59 has a solid or unitary annular bearing portion 60 adapted to receive the cantilever portion 22 of the crank pin 19. The annular bearing 60 has a forward opening 61 fitting the crank pin portion 22 and a second opening 62 which may be stepped as shown in Figs. 1 and 4 to fit a correspondingly stepped peripheral space of a flange 63 projecting outwardly from the crank pin 19, this stepped engagement holding the annular bearing 60 in position against rearward axial movement along the crank pin 19 and also providing a rear bearing face between the crank pin and the annular bearing 60. The bearing portion 60 is provided with an outer circumferential flange 64 which serves to stiffen the bearing portion and to prevent distortion of the axially spaced engaged bearings 61 and 62.

Intermediate these spaced bearing openings 61 and 62, the bearing portion 60 has a cylindrical opening 65 adapted to receive therewithin the annular bearings 66 and 67 of the remaining connecting rods 25 and 24 respectively, these annular bearings having outwardly extending stems 59' connected to the respective main rod portions of the connecting rods in a manner similar to that heretofore described in connection with the stem 59 of the connecting rod 23.

The annular bearings 66 and 67 are preferably likewise of solid or unitary construction, these annular bearings being journaled for relative rotation on the cantilever portion 22 of the crank pin 19. It will furthermore be noted that these annular bearings 66 and 67 have side faces in contact with each other, the bearing 60 contacting with the bearing 66 and the bearing 67 contacting with the shoulder portion of the crank pin 19 adjacent the aforesaid flange 63.

The bearing 60 of connecting rod 23 is provided with a pair of circumferentially and axially spaced slots or openings 68 and 69 through which the stem portions 69' of the respective bearings 67 and 66 project, the slots being of sufficient arcuate length to permit the angular swinging movement of the connecting rods 24 and 23 during their operation. The cylinders 10 preferably have their axes coplanar, the stem portions 59' being thus slightly offset axially of the crank pin with respect to their associated bearings 66 and 67 as illustrated in connection with the connecting rod 24 illustrated in Fig. 4.

The aforesaid valve gear driving pin 52 is provided with an outwardly extending annular flange 70 best illustrated in Figs. 4 and 6, this flange acting against the forward side face of the bearing 60 and thereby cooperating with the rear stepped bearing opening 62 to maintain the connecting rods in assembly on the cantilever end 22 of the crank pin 19. In order to secure the driving pin 52 with the crank pin and the latter with the connecting rod 23, the flange 70 and bearing 60 are provided with cooperating annular grooves receiving an inwardly-springing lock ring 71, this ring having one of its ends bent inwardly at 72 to engage aligned openings 73 and 74 respectively provided in the contacting faces of bearing 60 and crank pin 19 with the driving pin 52. Thus, the connecting rod 23 has its bearing 60 fixed to the cantilever portion 22 of the crank pin 19, the connecting rods 24 and 25 having their respective bearings 67 and 66 articulated on the cantilever portion of the crank pin. Furthermore, it will be noted that the bearing 60 spans the annular bearings 66 and 67 so as to axially overlap these bearings and receive these bearings within the opening 65 of the bearing 60.

It will be noted that each of the bearing openings 61 and 62 of the bearing 60 present less bearing area in a direction transversely of crank pin 19 than either of the corresponding bearing areas presented by the bearings 66 and 67, the arrangement being preferably such that the total bearing areas of the bearings 60, 66, and 67 on the crank pin 19 are substantially the same.

As the pistons 26 successively operate inwardly through their respective connecting rods, the crank pin 19 will rotate the crankshaft 11, the driving pin 52 operating the valve shafts 44 in unison to positively operate the intake and exhaust valves 29 and 30 associated with each cylinder 10 in properly timed sequence of operation. The crank pin 19 being connected with the connecting rod 23 will therefore have rotation on its axis relative to the rotation of the crankshaft 11 by reason of the bearings 20 and 21 carried by the crankshaft.

My improvements are adapted to permit relatively high engine speeds such as 5,000 to 10,000 R. P. M. although it will be understood that such values of engine R. P. M. are cited herein only for illustrative purposes in order to illustrate the unusual operating characteristics of my improvements and such values in practice may be varied as desired.

Various modifications and changes will be readily apparent from the teachings of my invention, as set forth in the appended claims, and it is not my intention to limit my invention to the particular details of construction and operation shown and described for illustrative purposes.

What I claim is:

1. In an internal combustion engine having a crank, a plurality of connecting rods radiating from said crank, each of said connecting rods having an annular cylindrical bearing operatively engaging said crank, the cylindrical bearing of one of said connecting rods being positioned within the cylindrical bearing of another of said connecting rods.

2. In an internal combustion engine having a crank, a plurality of connecting rods radiating from said crank, each of said connecting rods having an annular cylindrical bearing portion provided with a bearing surface operatively engaging with said crank, one of said cylindrical bearing portions being overlapped with another cylindrical bearing portion longitudinally of said crank.

3. In an internal combustion engine having a crank, a plurality of connecting rods radiating from said crank, each of said connecting rods having an annular cylindrical bearing portion provided with a bearing surface operatively engaging said crank, one of said cylindrical bearing portions being overlapped with another cylindrical bearing portion longitudinally of said crank, said overlapping annular bearing having an opening intermediate the length of its cylindrical portion receiving the connecting rod of the overlapped cylindrical bearing portion.

4. In an internal combustion engine having a crank, a plurality of connecting rods radiating from said crank, each of said connecting rods having an annular cylindrical bearing portion surrounding said crank and provided with a bearing surface operatively engaging said crank, one of said cylindrical bearing portions spanning another longitudinally of said crank.

5. In an internal combustion engine having a crank, a plurality of connecting rods radiating from said crank, each of said connecting rods having an annular cylindrical bearing portion surrounding said crank and provided with a bearing surface operatively engaging said crank, one of said cylindrical bearing portions receiving a plurality of other of said cylindrical bearing portions therewithin.

6. In an internal combustion engine having a crank, a plurality of connecting rods radiating from said crank, each of said connecting rods having an annular cylindrical bearing portion surrounding said crank and provided with a bearing surface operatively engaging said crank, one of said cylindrical bearing portions overlapping a plurality of other of said cylindrical bearing portions longitudinally of said crank.

7. In an internal combustion engine having a crank, a plurality of connecting rods radiating from said crank, each of said connecting rods having an annular cylindrical bearing portion surrounding said crank and provided with a bearing surface operatively engaging said crank, one of said cylindrical bearing portions spanning a plurality of other of said cylindrical bearing portions longitudinally of said crank.

8. In an internal combustion engine having a crank, a plurality of connecting rods radiating from said crank, each of said connecting rods having an annular cylindrical bearing portion surrounding said crank and provided with a bearing surface operatively engaging said crank, one of said cylindrical bearing portions having axially spaced bearing surface portions thereof engaging said crank, another of said cylindrical bearing portions having its bearing surface engaging said crank intermediate said spaced bearing surface portions.

9. In an internal combustion engine having a crank shaft provided with a crank pin rotatably journalled therein, a plurality of connecting rods radiating from said crank pin, annular bearings respectively carried by said connecting rods and arranged adjacent one another axially of said crank pin, said bearings rotatably engaging said crank pin.

10. In an internal combustion engine having a crank pin, a plurality of connecting rods radiating from said crank pin, annular cylindrical bearings respectively carried by said connecting rods said bearings having bearing surfaces arranged adjacent one another axially of said crank pin, one of said cylindrical bearings spanning a plurality of others axially of said crank pin and being non-rotatably connected to said crank pin, said other cylindrical bearings rotatably engaging said crank pin within said span.

11. In an internal combustion engine having a cantilever crank pin and a valving mechanism driven therefrom, a plurality of connecting rods radiating from said crank pin, each of said rods having a bearing surrounding said pin, and means carried by said pin for maintaining said bearings in position and for imparting a drive from said pin to said valving mechanism.

12. In a unitary connecting rod structure, a T-shaped portion providing a piston pin at one end thereof, said T-shaped portion having an inwardly extending stem, a unitary bearing portion at the other end thereof, the outer end of said main rod portion being secured to said stem, a hollow main rod portion intermediate said piston pin and bearing portions, said bearing portion having a crank pin receiving opening and an outwardly extending stem adjacent thereto, the inner end of said main rod portion being secured to said outwardly extending stem.

13. In an internal combustion engine having a cantilever crank pin and a valving mechanism driven therefrom, a plurality of connecting rods radiating from said crank pin, each of said rods having a bearing surrounding said pin, and means carried by said pin for maintaining said bearings in position and for imparting a drive from said pin to said valving mechanism, said means comprising a drive pin projecting beyond the crank pin in the direction of the axis thereof.

14. In an internal combustion engine having a cantilever crank pin and a valving mechanism driven therefrom, a plurality of connecting rods radiating from said crank pin, each of said rods having a bearing surrounding said pin, and means carried by said pin for maintaining said bearings in position and for imparting a drive from said pin to said valving mechanism, said means comprising a drive pin projecting beyond the crank pin in the direction of the axis thereof, said drive pin having a flange extending therefrom transversely to the axis of said drive pin and radially outwardly therefrom beyond said crank pin to provide an abutment for said bearings.

15. In an internal combustion engine having a cantilever crank pin and a valving mechanism driven therefrom, a plurality of connecting rods radiating from said crank pin, each of said rods having a bearing surrounding said pin, and means carried by said pin for maintaining said bearings in position and for imparting a drive from said pin to said valving mechanism, said means comprising a drive pin having a portion thereof seated within the end of said crank pin.

16. In an internal combustion engine having a cantilever crank pin and a valving mechanism driven therefrom, a plurality of connecting rods radiating from said crank pin, each of said rods having a bearing surrounding said pin, and means carried by said pin for maintaining said bearings in position and for imparting a drive from said pin to said valving mechanism, said means comprising a drive pin having a portion thereof seated within the end of said crank pin, said drive pin having a radially extending flange engaging the end of said crank pin and one of said bearings.

17. In an internal combustion engine, a rotatable crankshaft, a crank pin having its axis extending parallel to the crankshaft axis and being radially offset therefrom, means rotatably journalling one end of said crank pin in said crankshaft for rotation relative to said crankshaft rotation, said crank pin having a cantilever portion extending from said crankshaft in the direction of said crank pin axis, and a plurality of connecting rods radiating from the cantilever portion of said crank pin.

18. In an internal combustion engine, a rotatable crank shaft, a crank pin having its axis extending parallel to the crankshaft axis and being radially offset therefrom, means rotatably journalling one end of said crank pin in said crankshaft for rotation relative to said crankshaft rotation, said crank pin having a cantilever portion extending from said crankshaft in the direction of said crank pin axis, a plurality of connecting rods having annular bearings arranged side by side along said cantilever portion of said crank pin, and means for operably positioning said rods on said cantilever pin portion to prevent displacement thereof axially of said crank pin.

19. In an internal combustion engine, a rotatable crankshaft, a crank pin having its axis extending parallel to the crankshaft axis and being radially offset therefrom, means rotatably journalling one end of said crank pin in said crankshaft for rotation relative to said crankshaft rotation, said crank pin having a cantilever portion extending from said crankshaft in the direction of said crank pin axis, a plurality of connecting rods having annular bearings arranged side by side along said cantilever portion of said crank pin, and an abutment carried by said crank pin substantially intermediate said journalled end portion and said cantilever portion for preventing displacement of said connecting rod bearings axially of said crank pin in a direction toward said crankshaft.

20. In an internal combustion engine, a rotatable crankshaft, a crank pin having its axis extending parallel to the crankshaft axis and being radially offset therefrom, means rotatably journalling one end of said crank pin in said crankshaft for rotation relative to said crankshaft rotation, said crank pin having a cantilever portion extending from said crankshaft in the direction of said crank pin axis, a plurality of connecting rods having annular bearings arranged side by side along said cantilever portion of said crank pin, an abutment carried by said crank pin substantially intermediate said journalled end portion and said cantilever portion for preventing displacement of said connecting rod bearings axially of said crank pin in a direction toward said crankshaft, said crank pin having an axial bore open at the free end of said cantilever portion, and a pin seated in said opening and having a radial flange providing an abutment for preventing displacement of said connecting rod bearings axially of said crank pin in a direction away from said crankshaft.

ROGER K. LEE.